United States Patent
Reinmuth et al.

(10) Patent No.: US 8,752,431 B2
(45) Date of Patent: Jun. 17, 2014

(54) ACCELERATION SENSOR METHOD FOR OPERATING AN ACCELERATION SENSOR

(75) Inventors: Jochen Reinmuth, Reutlingen (DE); Harald Emmerich, Kusterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 349 days.

(21) Appl. No.: 13/148,038

(22) PCT Filed: Dec. 11, 2009

(86) PCT No.: PCT/EP2009/066900
§ 371 (c)(1),
(2), (4) Date: Oct. 13, 2011

(87) PCT Pub. No.: WO2010/088995
PCT Pub. Date: Aug. 12, 2010

(65) Prior Publication Data
US 2012/0017681 A1    Jan. 26, 2012

(30) Foreign Application Priority Data
Feb. 4, 2009  (DE) .......................... 10 2009 000 594

(51) Int. Cl.
*G01P 15/125* (2006.01)
(52) U.S. Cl.
USPC ....................................................... 73/514.32
(58) Field of Classification Search
USPC .............................. 73/514.32, 514.38, 514.36
See application file for complete search history.

(56) References Cited

U.S. PATENT DOCUMENTS

| | | | | |
|---|---|---|---|---|
| 5,488,864 A * | 2/1996 | Stephan | .................... | 73/514.32 |
| 7,426,863 B2 * | 9/2008 | Kuisma | ..................... | 73/514.32 |
| 7,487,661 B2 * | 2/2009 | Ueda et al. | ..................... | 73/1.39 |
| 7,624,638 B2 * | 12/2009 | Konno et al. | ............... | 73/514.32 |
| 8,047,075 B2 * | 11/2011 | Nasiri et al. | ............... | 73/514.32 |

(Continued)

FOREIGN PATENT DOCUMENTS

| EP | 0 244 581 | 11/1987 |
|---|---|---|
| EP | 0 773 443 | 5/1997 |

(Continued)

OTHER PUBLICATIONS

International Search Report for PCT/EP2009/066900, dated Apr. 6, 2011.

*Primary Examiner* — Helen Kwok
(74) *Attorney, Agent, or Firm* — Kenyon & Kenyon LLP

(57) ABSTRACT

An acceleration sensor includes a housing, a first seismic mass which is formed as a first asymmetrical rocker and is disposed in the housing via at least one first spring, a second seismic mass which is formed as a second asymmetrical rocker and is disposed in the housing via at least one second spring, and a sensor and evaluation unit which is designed to ascertain information regarding corresponding rotational movements of the first seismic mass and the second seismic mass in relation to the housing and to determine acceleration information with respect to an acceleration of the acceleration sensor, taking the ascertained information into account. In addition, a method for operating an acceleration sensor is disclosed. The rockers execute opposite rotational movements in response to the presence of an acceleration. A differential evaluation of the signals makes it possible to free the measuring signal of any existing interference signals.

9 Claims, 5 Drawing Sheets

(56) References Cited

U.S. PATENT DOCUMENTS

| | | | |
|---|---|---|---|
| 8,205,498 B2 * | 6/2012 | Hsu et al. | 73/514.32 |
| 8,347,721 B2 * | 1/2013 | Reinmuth | 73/514.32 |
| 2004/0221650 A1 * | 11/2004 | Lehtonen | 73/514.32 |
| 2007/0000323 A1 | 1/2007 | Kuisma | |
| 2008/0158370 A1 * | 7/2008 | Pasolini et al. | 348/208.4 |
| 2008/0173959 A1 * | 7/2008 | Merassi et al. | 257/415 |
| 2008/0314147 A1 | 12/2008 | Nasiri et al. | |
| 2010/0011860 A1 * | 1/2010 | Offenberg et al. | 73/514.32 |

FOREIGN PATENT DOCUMENTS

| | | |
|---|---|---|
| JP | 8-220134 | 8/1996 |
| JP | 2010-127648 | 6/2010 |
| WO | WO 2007/125961 | 11/2007 |

* cited by examiner

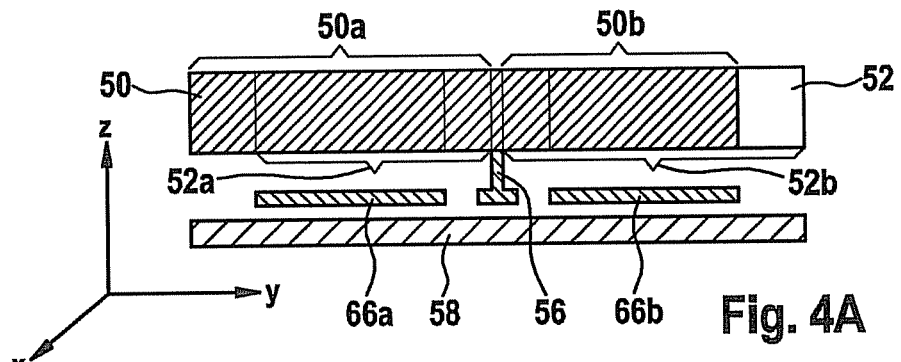
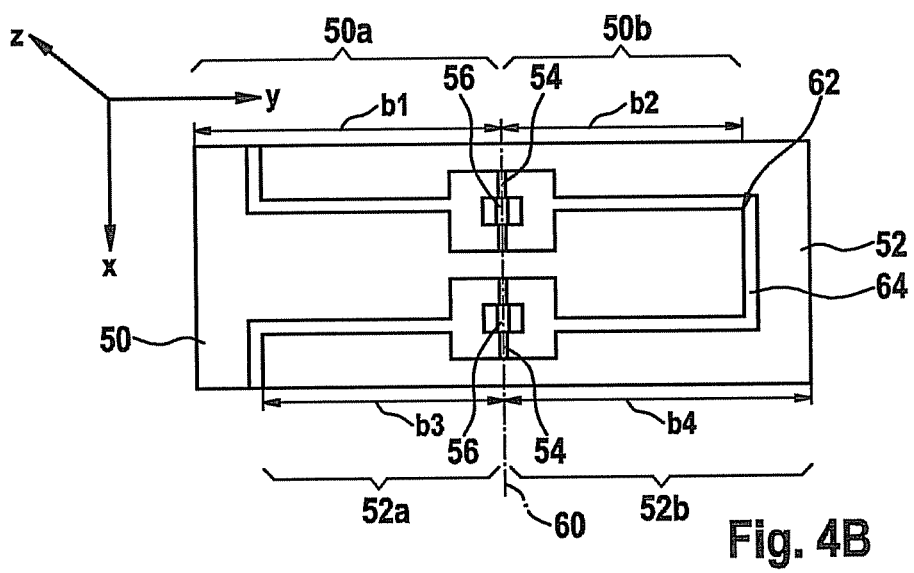
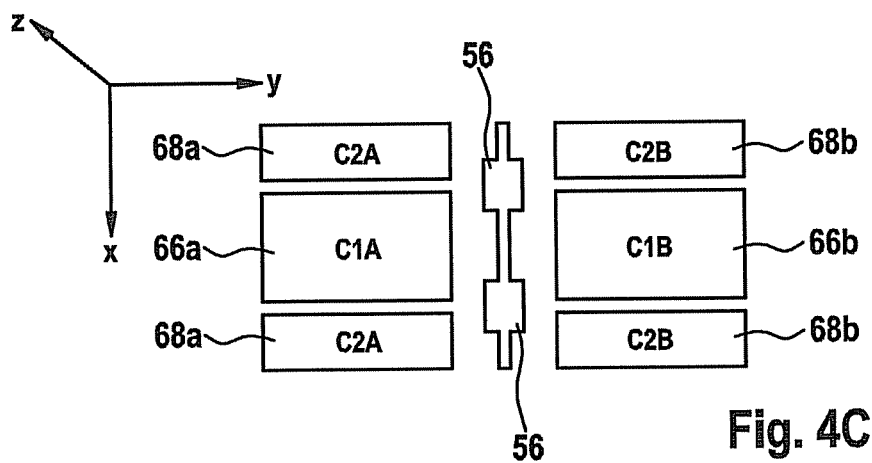

ACCELERATION SENSOR METHOD FOR OPERATING AN ACCELERATION SENSOR

FIELD OF THE INVENTION

The present invention relates to an acceleration sensor and a method for operating an acceleration sensor.

BACKGROUND

A conventional acceleration sensor often takes the form of a capacitive acceleration sensor. The seismic mass of the capacitive acceleration sensor may be formed as an antisymmetric rocker. A micromechanical acceleration sensor having a seismic mass in the form of an antisymmetric rocker is described, for example, in European Patent Application Publication EP 0 773 443 A1.

Seismic masses in the form of rockers are also used for sensors to determine a tilt angle of a vehicle. A sensor of that kind for determining a tilt angle of a vehicle is described, for example, in European Patent Application Publication EP 0 244 581 A1.

FIGS. 1A to 1C show, respectively, one cross-section and two plan views to illustrate a conventional acceleration sensor.

The capacitive acceleration sensor shown in cross-section in FIG. 1A is designed to detect an acceleration of the acceleration sensor oriented in a direction perpendicular to a wafer 10 (z-direction), and to determine a quantity corresponding to the acceleration. To that end, a seismic mass 12 formed as an antisymmetric rocker is adjustably disposed above wafer 10. Seismic mass 12 is joined via two torsion springs 14 (see FIG. 1B) to an anchoring 16, which is fixedly disposed on wafer 10. Torsion springs 14, not shown in FIG. 1A, extend along a longitudinal axis 18, around which seismic mass 12 in the form of a rocker is adjustable.

Seismic mass 12 includes a first electrode 20a situated on a first side of longitudinal axis 18, and a second electrode 20b situated on the second side of longitudinal axis 18. Because of an additional mass 22, second electrode 20b may have a larger mass than first electrode 20a.

Counter-electrodes 24a and 24b to electrodes 20a and 20b of seismic mass 12 are applied fixedly on wafer 10. The sensor principle of the acceleration sensor is thus based on a spring-mass system, in which movable seismic mass 12, together with counter-electrodes 24a and 24b fixed in position on wafer 10, form two plate-type capacitors. In this context, counter-electrodes 24a and 24b, shown in plan view in FIG. 1C, are disposed in such a way in relation to electrodes 20a and 20b that the position of seismic mass 12 relative to wafer 10 is ascertainable by evaluation of a first capacitance between electrode 20a and associated first counter-electrode 24a and a second capacitance between electrode 20b and associated second counter-electrode 24b.

FIG. 2 shows a cross-section through the conventional acceleration sensor of FIGS. 1A to 1C to illustrate its mode of operation.

If, as shown in FIG. 2, the acceleration sensor experiences an acceleration 26 in the z-direction, then, because of additional mass 22, a force aimed in the direction of wafer 10 acts on second electrode 20b. Therefore, due to acceleration 26, seismic mass 12 in the form of a rocker is moved around the longitudinal axis (not sketched) in such a way that a first average distance d1 between first electrode 20a and first counter-electrode 24a increases, and a second average distance d2 between second electrode 20b and second counter-electrode 24b decreases.

The changes in the capacitances of the two capacitors, formed of electrodes 20a and 20b and counter-electrodes 24a and 24b, which correspond to the changes in distances d1 and d2, may subsequently be evaluated to determine acceleration 26. Since methods for evaluating changes in capacitance are known from the related art, they are not further discussed here.

FIG. 3 shows a cross-section through the conventional acceleration sensor of FIGS. 1A to 1C in the context of a mechanical stress exerted on the acceleration sensor.

In FIG. 3, a mechanical stress is acting upon wafer 10, by which wafer 10 is bent asymmetrically along the y-axis. For example, first average distance d1 between first electrode 20a and first counter-electrode 24a changes due to the asymmetrical bending of wafer 10. In the same way, second average distance d2 between second electrode 20b and second counter-electrode 24b may increase or decrease under the influence of a mechanical stress.

Thus, in the case of the conventional acceleration sensor, a mechanical stress, which, for example, is produced via a force or via a pressure on at least one part of the acceleration sensor, particularly on a subunit of the housing, is able to bring about a change in the capacitance of the capacitors made up of electrodes 20a and 20b and counter-electrodes 24a and 24b. As a rule, an evaluation unit (not shown) of the acceleration sensor is unable to distinguish the change in capacitance caused by an influence of stress from a change in capacitance triggered by an acceleration of the acceleration sensor. As a result, the acceleration sensor interprets a mechanical stress as an acceleration, and outputs a corresponding false message. This is also referred to as an offset of the measured acceleration caused by an influence on the housing.

It is desirable to have the possibility of operating an acceleration sensor in which the acceleration sensor is relatively insensitive to a mechanical stress exerted on the acceleration sensor.

SUMMARY

The present invention provides an acceleration sensor and a method for operating an acceleration sensor.

The present invention is based on the finding that it is possible to detect, as such, filter out and/or compensate for a change in the first position of the first seismic mass in relation to the housing caused by an effect of stress on the housing, by designing the sensor and evaluation unit to ascertain the information regarding corresponding rotational movements of the first seismic mass and the second seismic mass in relation to the housing and to determine acceleration information with respect to an acceleration of the acceleration sensor, taking the ascertained information into account. An acceleration of the acceleration sensor brings about corresponding rotational movements of the two seismic masses about the torsion axis of their springs. For example, the directions of the asymmetries of the two seismic masses are established in such a way that in response to an acceleration of the acceleration sensor, the first seismic mass is moved in a first direction of rotation and the second seismic mass is moved in a second direction of rotation differing from the first direction of rotation. The position of the first seismic mass thereby changes in relation to the second seismic mass. Preferably, the second direction of rotation may be counter to the first direction of rotation. In contrast, changes in the positions of the two seismic masses to be attributed to stress influences are erratic, in particular, the position of the first seismic mass in relation to the second seismic mass not changing. Therefore, the sensor and evaluation unit is able to detect, as such, changes which are not caused by acceleration, filter them out and/or compensate for them.

For instance, a bending of the housing brings about a change of at least one position of one of the two seismic masses in relation to the housing. However, since the sensor and evaluation unit is not designed exclusively to determine the acceleration information based on a change in position of the single seismic mass, it is also not susceptible to the faults which occur in the case of a conventional design of the sensor and evaluation unit and when the acceleration sensor is furnished with only one seismic mass.

In one possible specific embodiment, the sensor and evaluation unit compares a change in the first position of the first seismic mass to a change in the second position of the second seismic mass possibly occurring at the same time. However, as explained in greater detail hereinafter, the mode of operation of the sensor and evaluation unit is not limited to this specific embodiment.

Thus, the present invention permits an acceleration sensor which is considerably less sensitive to a mechanical stress. Consequently, it is possible to use an inexpensive type of housing for the acceleration sensor even if the inexpensive type of housing itself reacts more sensitively to the mechanical stress, since the acceleration sensor performs its function reliably, even in the event of a deformation of the housing. For example, it is thus possible to use a molded housing instead of a premold housing for an acceleration sensor.

In addition, the present invention makes it possible to compensate for surface charge effects which may occur due to the different potentials of the various materials of housing components, electrodes and/or a rocker. This ensures that the surface charge effects cannot contribute to a corruption of the acceleration information determined with respect to the acceleration of the acceleration sensor, as is customarily often the case.

In one advantageous specific embodiment, the torsion axis of the first spring subdivides the first seismic mass into a first partial mass on a first side of the torsion axis of the first spring and into a second partial mass on a second side of the torsion axis of the first spring, the second partial mass being lighter than the first partial mass; the torsion axis of the second spring subdivides the second seismic mass into a third partial mass on a first side of the torsion axis of the second spring and into a fourth partial mass on a second side of the torsion axis of the second spring, the fourth partial mass being heavier than the third partial mass. For example, the additional mass of the first partial mass in relation to the second partial mass and/or the additional mass of the fourth partial mass in relation to the third partial mass is able to be realized by a larger patterning of the first partial mass and/or the fourth partial mass out of a micromechanical functional layer and/or by an additional coating of the first partial mass and/or the fourth partial mass. Thus, it is possible to inexpensively produce the acceleration sensor having the first antisymmetric rocker and the second antisymmetric rocker.

Advantageously, the first seismic mass includes a first electrode situated on the first side of the torsion axis of the first spring and a second electrode situated on the second side of the torsion axis of the first spring, and the second seismic mass includes a third electrode situated on the first side of the torsion axis of the second spring and a fourth electrode situated on the second side of the torsion axis of the second spring, the sensor and evaluation unit including four counter-electrodes which are fixedly disposed in relation to the housing. Thus, the sensor and evaluation unit may be produced easily and cost-effectively using standard methods.

For example, the sensor and evaluation unit is designed in such a way that a first capacitance between the first electrode and an associated first counter-electrode of the four counter-electrodes and a fourth capacitance between the fourth electrode and an associated fourth counter-electrode of the four counter-electrodes are interconnected to form a first sum, and a second capacitance between the second electrode and an associated second counter-electrode of the four counter-electrodes and a third capacitance between the third electrode and an associated third counter-electrode of the four counter-electrodes are interconnected to form a second sum. Furthermore, the sensor and evaluation unit may additionally be designed to ascertain a difference between the first sum and the second sum, and to determine the acceleration information regarding he acceleration of the acceleration sensor based on the difference ascertained. In this manner, changes in the first position and/or the second position brought about by stress influences may be offset reliably and with little work expenditure.

In particular, the torsion axis of the first spring may lie on the torsion axis of the second spring. The acceleration sensor therefore has a very symmetrical design. Given this symmetrization, surface charge effects between a substrate, the electrodes and the two antisymmetric rockers have almost no influence any longer on the sensor performance.

In one advantageous further development, the first seismic mass and the second seismic mass are formed in such a way and disposed in at least one position relative to each other such that at least one end section of the first seismic mass directed away from the torsion axis of the first spring extends into at least one interspace defined by the second seismic mass. In this case, the two seismic masses in the form of asymmetrical rockers in the acceleration sensor are so interlaced that an asymmetrical bending of the substrate is able to be offset in reliable fashion. In this context, it is especially advantageous if, in addition, the electrodes are interconnected in the manner described above.

For example, the first seismic mass includes a first comb-like section having at least one tooth and the second seismic mass includes a second comb-like section having at least two teeth, the first seismic mass in at least one position being disposed relative to the second seismic mass in such a way that the at least one tooth of the first comb-like section extends into the at least one interspace between the at least two teeth of the second comb-like section. The construction of the two seismic masses described here has a very symmetrical design. In addition, this is advantageous in terms of the surface charge effects already described above.

Furthermore, the first seismic mass may include at least one third comb-like section and the second seismic mass may include at least one fourth comb-like section. Such a formation of the seismic masses additionally reduces the effects of asymmetrical deformations of the housing.

The advantages described in the paragraphs above are also ensured in the case of a corresponding method for operating an acceleration sensor.

Further features and advantages of the present invention are explained in the following with reference to the figures.

BRIEF DESCRIPTION OF THE DRAWINGS

FIGS. 4A to 4C show one cross-section and two plan views to illustrate a first specific embodiment of the acceleration sensor.

DETAILED DESCRIPTION

Figure 1A:
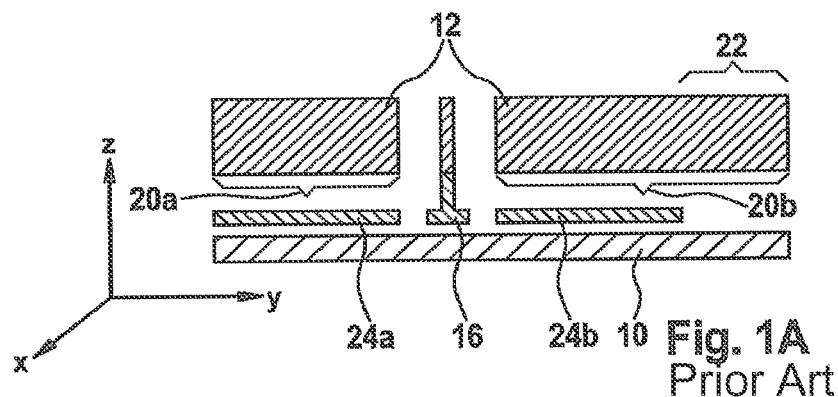
FIGS. 1A to 1C show one cross-section and two plan views to illustrate a conventional acceleration sensor.
Figure 1B:
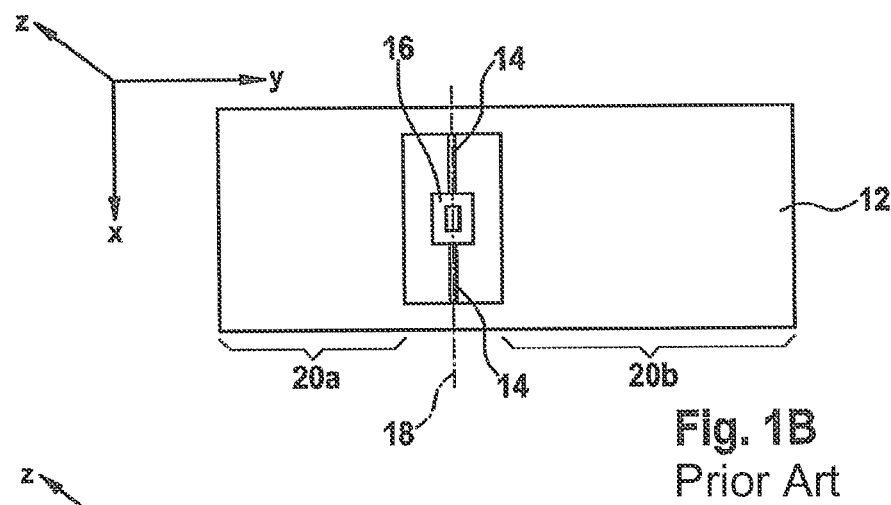
Figure 1C:
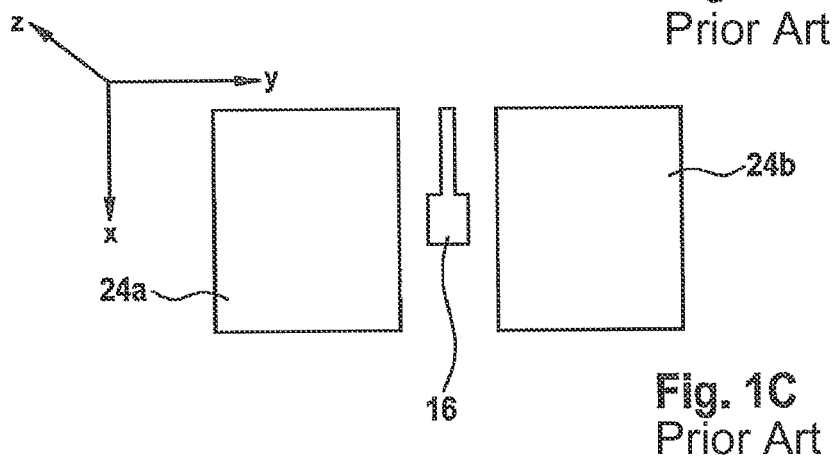
Figure 2:
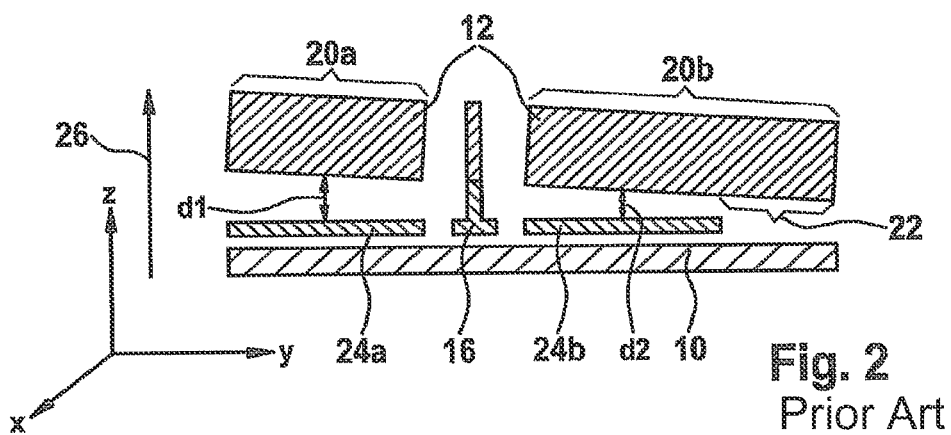
FIG. 2 shows a cross-section through the conventional acceleration sensor of FIGS. 1A to 1C to illustrate its mode of operation.
Figure 3:
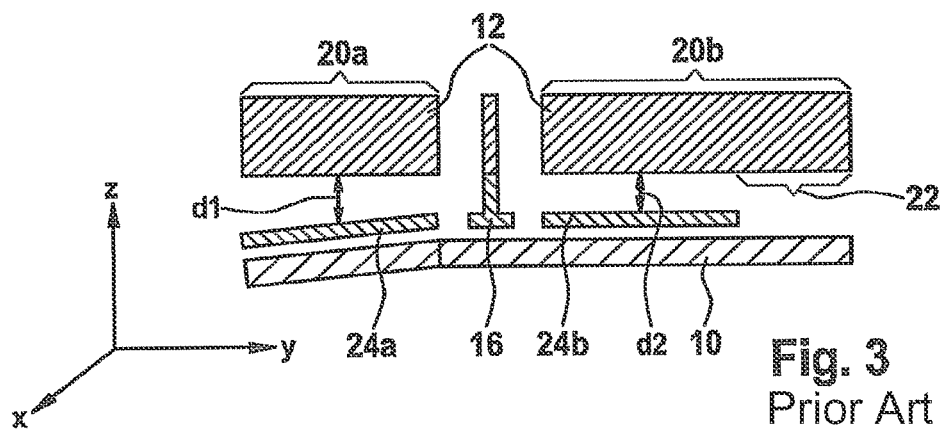
FIG. 3 shows a cross-section through the conventional acceleration sensor of FIGS. 1A to 1C in the case of a mechanical stress exerted on the acceleration sensor.

FIGS. 4A to 4C show one cross-section and two plan views to illustrate a first specific embodiment of the acceleration sensor.

The schematically rendered acceleration sensor has a first seismic mass 50 and a second seismic mass 52. First seismic mass 50 is joined via at least one spring 54 (see FIG. 4B) to at least one anchoring 56, which is fixedly disposed on a base substrate 58. Correspondingly, at least one further spring 54 joins second seismic mass 52 to at least one anchoring 56 attached to base substrate 58. The two seismic masses 50 and 52 may also be joined via at least two springs 54 to at least one anchoring 56 in common.

The at least two springs 54 may take the form of torsion springs. For example, springs 54 may run along a common longitudinal axis, referred to hereinafter as axis of rotation 60. However, it is stressed here that the present invention is not limited to springs 54 which lie on one common axis of rotation 60. In the present invention, the at least one spring 54 of first seismic mass 50 may also have a different torsion axis than the at least one spring 54 of second seismic mass 52. Moreover, the number of springs 54 and anchorings 56, as well as the placement of seismic masses 50 and 52 relative to springs 54 and anchorings 56 are not restricted to the specific embodiment described here.

The two seismic masses 50 and 52 are disposed in the acceleration sensor in such a way that, provided the acceleration sensor experiences no acceleration, they are in their initial positions in relation to base substrate 58. For example, the two seismic masses 50 and 52 in their initial positions are disposed parallel to each other. In particular, the two seismic masses 50 and 52 in their initial positions may lie in one common plane, which advantageously is aligned parallel to base substrate 58. This facilitates the production of the acceleration sensor, since in this case, seismic masses 50 and 52 are patternable in their initial positions out of one micromechanical functional layer, advantageously together with springs 54. It is therefore not necessary to adjust seismic masses 50 and 52. Axis of rotation 60 subdivides first seismic mass 50 into a first partial mass 50a and a second partial mass 50b, first partial mass 50a located on a first side of axis of rotation 60 having a larger mass than second partial mass 50b located on a second side of axis of rotation 60. Because of the different masses of the two partial masses 50a and 50b, first seismic mass 50 is in the form of an antisymmetric rocker which is disposed so as to be adjustable about axis of rotation 60 in relation to base substrate 58.

Second seismic mass 52 is also in the form of an antisymmetric rocker, axis of rotation 60 subdividing second seismic mass 52 into a third partial mass 52a and a fourth partial mass 52b. Third partial mass 52a located on the first side of axis of rotation 60 has a smaller mass than second partial mass 52b situated on the second side of axis of rotation 60. A "rocking movement" of second seismic mass 52 is understood to be a rotation of second seismic mass 52 about axis of rotation 60.

For example, the additional mass of first partial mass 50a in relation to second partial mass 50b and/or the additional mass of fourth partial mass 52b in relation to third partial mass 52a is determined by a larger patterning of first partial mass 50a and/or of fourth partial mass 52b out of a micromechanical functional layer. As an alternative or as an addition to that, the unequal mass distribution may also be realized by an additional coating of first partial mass 50a and/or of fourth partial mass 52b.

Partial masses 50a, 50b, 52a and 52b are formed at least partially as electrodes. However, for the sake of better clarity, the areas of partial masses 50a, 50b, 52a and 52bacting as electrodes are not marked in FIGS. 4A to 4C.

Preferably, the area of a first electrode of first partial mass 50a is equal to an area of a second electrode of second partial mass 50b. Correspondingly, second seismic mass 52 may also be formed in such a way that an area of a third electrode of third partial mass 52a is equal to an area of a fourth electrode of fourth partial mass 52b. In addition to this, the area of the third electrode may be equal to the area of the first electrode. The advantages of forming the four electrodes with equal area are discussed in greater detail below.

In addition, at least one of seismic masses 50 or 52 may be formed in such a way that at least one of its electrodes is made up of at least two electrode regions disposed separate from each other. For example, the third and the fourth electrode each include two electrode regions disposed separate from each other. In this case, the area of the electrode is understood to be the sum of the areas of the at least two electrode regions.

In the case of the specific embodiment of the acceleration sensor described here, the two seismic masses 50 and 52 are in the form of two interlaced rockers. For example, two interlaced rockers is understood to mean that the two seismic masses 50 and 52 are formed in such a way and, in at least one position, are disposed relative to each other such that at least one end section 62 of second partial mass 50b of first seismic mass 50 directed away from axis of rotation 60 extends into at least one interspace 64 which is defined by fourth partial mass 52b of second seismic mass 52. The at least one position of the two seismic masses 50 and 52 is preferably the initial position of the two seismic masses 50 and 52.

For example, first partial mass 50a has a maximum width b1 which is greater than a maximum width b3 of third partial mass 52a, the two widths b1 and b3 being oriented in a direction perpendicular to axis of rotation 60. Correspondingly, fourth partial mass 52b may have a maximum width b4 which runs perpendicular to axis of rotation 60 and is greater than maximum width b2 of second partial mass 50b perpendicular to axis of rotation 60.

In the case of the specific embodiment described here, entire second partial mass 50b of first seismic mass 50 extends into interspace 64 defined by fourth partial mass 52b of second seismic mass 52. Thus, in at least one position, the lateral faces of second partial mass 50b of first seismic mass 50 are framed two-dimensionally by the inner surfaces of fourth partial mass 52b of second seismic mass 52, which define interspace 64, and axis of rotation 60.

The formation of the two seismic masses 50 and 52 may also be described such that first seismic mass 50 is comb-like with one tooth and second seismic mass 52 is comb-like with two teeth. First seismic mass 50 is made up of a connecting part running parallel to the x-axis and the tooth aligned in the y-direction. Correspondingly, second seismic mass 52 includes a connecting part directed along the x-axis and the two teeth running in a direction perpendicular to the connecting part. In at least one position of the two seismic masses 50 and 52, the tooth of first seismic mass 50 extends into an interspace between the at least two teeth of second seismic mass 52.

It is pointed out here that the specific embodiment of FIG. 4B may also be modified by providing first seismic mass 50 with at least two teeth and second seismic mass 52 with two or more teeth. In this instance, in at least one position, several teeth of first seismic mass 50 may also extend into at least two interspaces between the teeth of second seismic mass 52. In this case, the number of springs 54 and anchorings 56 is adjusted accordingly. The advantages of such a modification are discussed below.

FIG. 4C shows a plan view of counter-electrodes 66a, 66b, 68a and 68b of the four electrodes of the two seismic masses 50 and 52, the counter-electrodes being fixedly disposed on base substrate 58. First counter-electrode 66a and the first electrode of first seismic mass 50 form a first capacitor having capacitance C1A. Correspondingly, second counter-electrode 66b cooperates with the second electrode of first seismic mass 50 as a second capacitor having capacitance C1B. The third electrode of second seismic mass 52 and third counter-electrode 68a form a third capacitor having capacitance C2A. In addition, the acceleration sensor includes a fourth capacitor made up of the fourth electrode of second seismic mass 52 and fourth counter-electrode 68b having capacitance C2B.

Preferably, the positioning of counter-electrodes 66a, 66b, 68a and 68b corresponds to the positioning of the four electrodes of the two seismic masses 50 and 52. For instance, third counter-electrode 68a may include two separate electrode areas, situated between which is first counter-electrode 66a. Correspondingly, fourth counter-electrode 68b may also be subdivided into two separate electrode areas, between which is second counter-electrode 66b. However, it is stressed here that the formation of counter-electrodes 66a, 66b, 68a and 68b is not limited to the exemplary embodiment of FIG. 4C. For example, third counter-electrode 68a and/or fourth counter-electrode 68b may each also take the form of a contiguous electrode area. It is advantageous to form counter-electrodes 66a, 66b, 68a and 68b with equal total areas, as explained in greater detail below.

As already explained above, first seismic mass 50 may also be formed as a comb having at least two teeth, and second seismic mass 52 may be formed as a comb having two or more teeth. In this case, counter-electrodes 66a, 66b, 68a and 68b may be adapted to the formation and the placement of the four electrodes accordingly.

Advantageously, the capacitors having capacitances C1A and C2B are interconnected in such a way that a first sum C1A+C2B of capacitances C1A and C2B is calculated. Correspondingly, the capacitors having capacitances C1B and C2A may also be interconnected with each other in such a way that a second sum C1B+C2A of capacitances C1B and C2A is calculable. In addition, it is advantageous to design the electronics of the acceleration sensor in such a way that a difference $\Delta_{ges}$ is ascertained between first sum C1A+C2B and second sum C1B+C2A, where:

$$\Delta_{ges}=(C1A+C2B)-(C1B+C2A) \quad \text{[Equation 1]}.$$

In this case, the acceleration which the acceleration sensor experiences may be determined by an evaluation unit based on the difference $\Delta_{ges}$. Since possibilities for determining the acceleration, while taking the difference $\Delta_{ges}$ into consideration, are known from the related art, it is not further discussed here.

Figure 5:
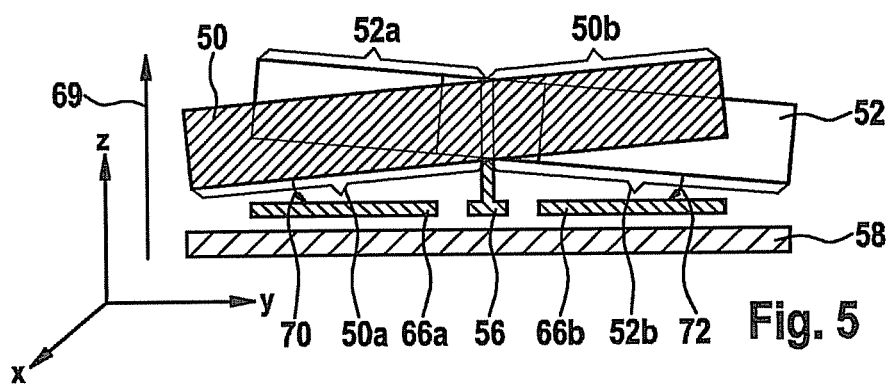
FIG. 5 shows a cross-section through the acceleration sensor of FIGS. 4A to 4C to illustrate its mode of operation.

FIG. 5 shows a cross-section through the acceleration sensor of FIGS. 4A to 4C to illustrate its mode of operation.

If the acceleration sensor undergoes an acceleration with an acceleration component 69 which runs perpendicular to base substrate 58 and in a direction from base substrate 58 to the two seismic masses 50 and 52 (in positive z-direction), then, because of their opposite asymmetrical Mass distributions relative to each other, the two seismic masses 50 and 52 in the form of rockers are moved in opposite directions of rotation 70 and 72 out of their initial positions about the axis of rotation (not sketched). That is to say, given such an acceleration component 69, heavier partial masses 50a and 52b, which lie on different sides of the axis of rotation, come closer to base substrate 58. Lighter partial masses 50b and 52a move away from base substrate 58. The two seismic masses 50 and 52 thus execute corresponding rotational movements.

Naturally, the functioning method of the acceleration sensor described in the paragraph above is also ensured if the two seismic masses 50 and 52 are mounted so as to be movable about different axes of rotation.

The rotational movements of the two seismic masses 50 and 52 in opposite directions of rotation 70 and 72 produce changes in signal $\Delta_{ges}$ of capacitances C1A, C1B, C2A and C2B of the four capacitors of the acceleration sensor. Thus, a value corresponding to acceleration component 69 may be determined based on signal $\Delta_{ges}$.

Similarly, an acceleration component which runs perpendicular to base substrate 58 and in a direction from the two seismic masses 50 and 52 to base substrate 58 (in negative z-direction) brings about a change in signal $\Delta_{ges}$. Therefore, the acceleration sensor described here is also able to determine a quantity for an acceleration component in the negative z-direction.

Figure 6:
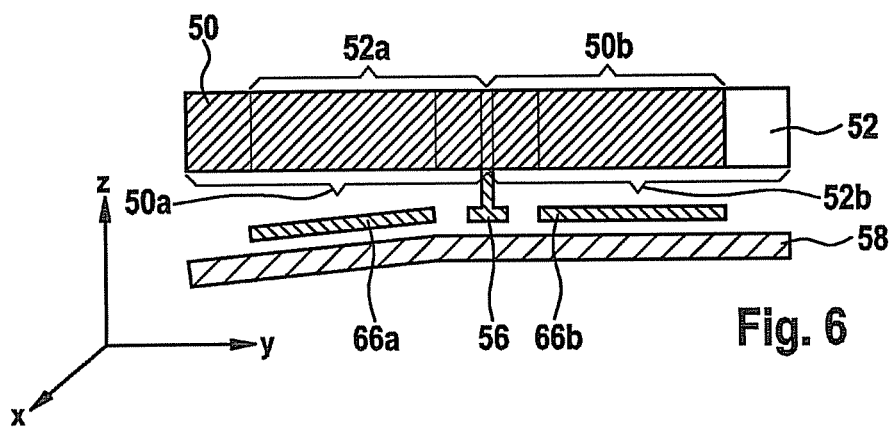
FIG. 6 shows a cross-section through the acceleration sensor of FIGS. 4A to 4C in the case of a mechanical stress exerted on the acceleration sensor.

FIG. 6 shows a cross-section through the acceleration sensor of FIGS. 4A to 4C in the context of a mechanical stress exerted on the acceleration sensor.

In FIG. 6, a mechanical stress, by which base substrate 58 is bent asymmetrically along the y-axis, is acting upon the acceleration sensor. Due to the asymmetrical bending of base substrate 58 along the y-axis, for example, the distances between the first electrode and first counter-electrode 66a, as well as the third electrode and third counter-electrode 68a change. The asymmetrical bending of base substrate 58 brings about a change in capacitances C1A and C2A accordingly.

Especially given equality of area of the first electrode and the third electrode, as well as of first counter-electrode 66a and third counter-electrode 68a, it is ensured that capacitances C1A and C2A each change by an equal differential capacitance $\Delta_C$. Capacitances C1A and C2A of the first and third capacitors are thus made up of a stress-free initial capacitance C1A0 or C2A0 prior to the occurrence of the mechanical stress and differential capacitance $\Delta_C$, where:

$$C1A=C1A0+\Delta_C \quad \text{[Equation 2]}$$

and $$C2A=C2A0+\Delta_C \quad \text{[Equation 3]}.$$

First sum C1A+C2B and second sum C1B+C2A calculated according to the procedure described above likewise change by differential capacitance $\Delta_C$, where:

$$C1A+C2B=C1A0+\Delta_C+C2B0 \quad \text{[Equation 4]}$$

and $$C1B+C2A=C1B0+C2A0+\Delta_C \quad \text{[Equation 5]}.$$

However, in calculating difference $\Delta_{ges}$, differential capacitance $\Delta_C$ cancels out again.

$$\Delta_{ges}=(C1A+C2B)-(C1B+C2A)=(C1A0+C2B0)-(C1B0+C2A0) \quad \text{[Equation 6]}.$$

Therefore, the bending of base substrate 58 along the y-axis brings about no change in difference $\Delta_{ges}$. In this manner, it is ensured that the asymmetrical bending of base substrate 58 along the y-axis has no influence on an acceleration component in the z-direction ascertained by the acceleration sensor.

Since the asymmetrical bending of base substrate 58 does not lead to corresponding rotational movements of the two seismic masses 50 and 52, it thus also causes no change in difference $\Delta_{ges}$. Therefore, a non-occurring acceleration of the acceleration sensor, based on the asymmetrical bending of base substrate 58, is prevented from being output as a false measured value.

In the exemplary embodiment of FIG. 4C, counter-electrodes 66a, 66b, 68a and 68b (as well as the electrodes) are segmented in the x-direction. In this manner, as described above, it is possible to fully compensate for asymmetrical bendings of base substrate 58 along the y-axis. Asymmetrical bendings along the x-axis are likewise sharply limited in their effects due to the three-fold segmentation in the x-direction.

At this point, it is particularly stressed that the specific embodiment of the acceleration sensor described in the paragraphs above is not limited to a segmentation in the x-direction. Depending upon the influence on the housing, it may also prove to be advantageous to carry out the segmentation in the y-direction, or in any other direction especially adapted to the housing.

Advantageously, the suspension of springs 54 is symmetrical for both rockers, in order to improve reliable compensation of a substrate bending. Furthermore, springs 54 may be formed in an analogous manner with respect to their coupling to the at least one anchoring 56. This additionally improves the compensation for a bending of the substrate.

With the aid of the following figures, it is explained how effects of an asymmetrical bending along the x-axis are able to be further limited by an increased segmentation. Already above, the acceleration sensor having a first seismic mass 50 formed as a comb with at least two teeth and having a second seismic mass 52 formed as a comb with two or more teeth is indicated as an example for an increased segmentation. In the same way, depending upon the area requirement and properties of the rocker suspension, it may prove advantageous, instead of a double rocker, to use a multi-rocker. An example for a multi-rocker is described with the aid of the following paragraphs.

Figure 7A:
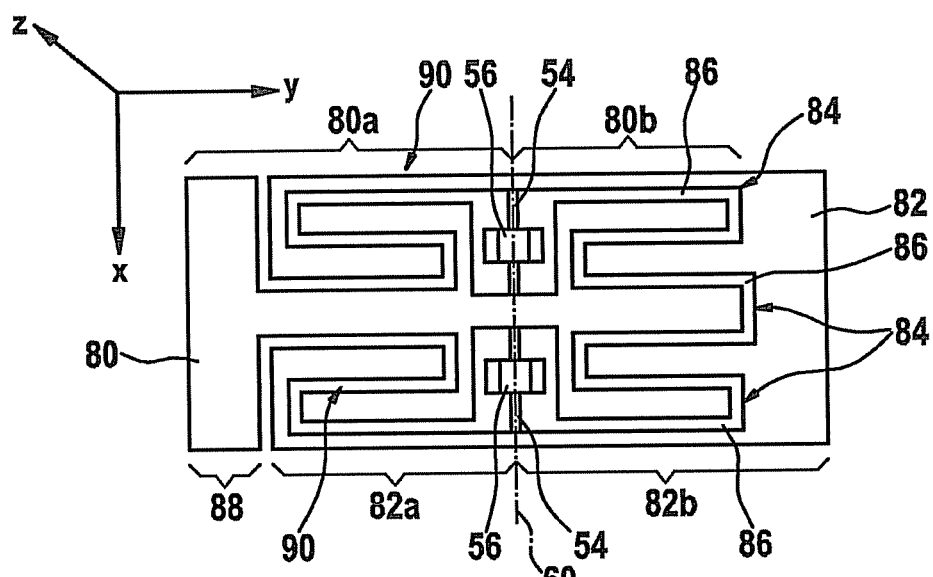
FIGS. 7A and 7B show plan views to illustrate a second specific embodiment of the acceleration sensor.
Figure 7B:
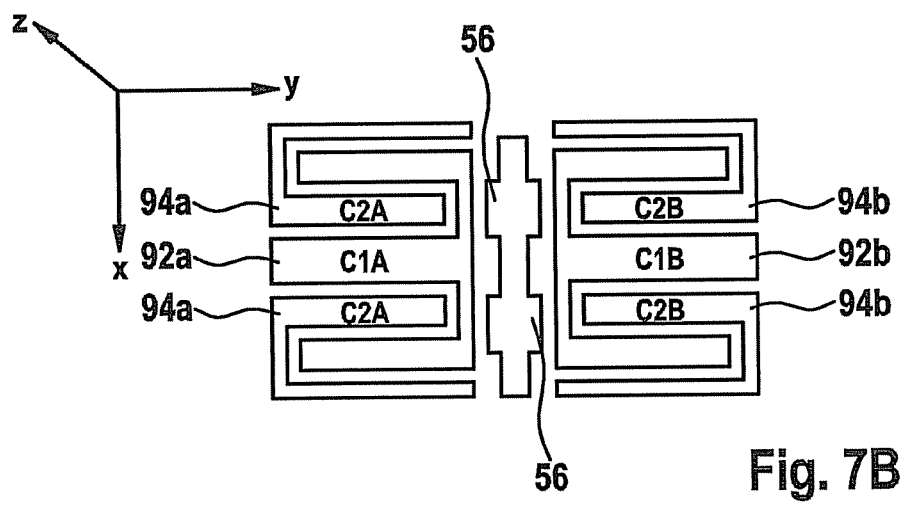

FIGS. 7A and 7B show plan views to illustrate a second specific embodiment of the acceleration sensor.

The two seismic masses 80 and 82 of the acceleration sensor shown schematically in FIGS. 7A and 7B are mounted in a manner allowing rotation about the axis of rotation by way of springs 54 already described, having anchorings 56 fixedly attached to the base substrate (not sketched) The axis of rotation subdivides first seismic mass 80 into a first partial mass 80a and a second partial mass 80b, and second seismic mass 82 into a third partial mass 82a and a fourth partial mass 82b. First partial mass 80a and third partial mass 82a are situated on a first side of the axis of rotation, and second partial mass 80b and fourth partial mass 82b are situated on a second side of the axis of- rotation.

In the exemplary embodiment shown, second partial mass 80b of first seismic mass 80 has three end sections 84 directed away from the axis of rotation, which extend into interspaces 86 defined by fourth partial mass 82b. In particular, the two seismic masses 80 and 82 may be formed in such a way relative to each other that the lateral faces of second partial mass 80b are framed by the inner surfaces of fourth partial mass 82b which bound a total inside space, and the axis of rotation.

This may also be described such that second partial mass 80b includes a first comb-like section having a connecting part and three teeth, and fourth partial mass 82b includes a second comb-like section having a connecting part and four teeth. The three teeth of the first comb-like section, which are aligned parallel to the y-axis, extend into the three interspaces between the four teeth of the second comb-like section which run parallel to the y-axis. The two connecting parts are aligned parallel to the x-axis.

First partial mass 80a likewise includes a third comb-like section having a connecting part and three teeth, an additional mass 88 being attached to the middle tooth of the third comb-like section. Additional mass 88 and the connecting part are aligned parallel to the x-axis, while the three teeth run along the y-axis. Third partial mass 82a has two comb-like sections 90 having one connecting part and two teeth each. The two outer teeth of the third comb-like section of first partial mass 80a in each case extend into an interspace between the two teeth of the two further comb-like sections 90 of third partial mass 82a.

Corresponding to the procedure described above, subunits of partial masses 80a, 80b, 82a and 82b are used as electrodes. Interacting counter-electrodes 92a, 92b, 94a and 94b are fixedly disposed in relation to the base substrate. The interconnection of the capacitors made up of the electrodes and counter-electrodes 92a, 92b, 94a and 94b corresponds to the example described above. Since the interaction of the capacitors for ascertaining an acceleration acting on the acceleration sensor is thus obvious for one skilled in the art, it is not further discussed here.

Due to the increased segmentation of the electrodes and counter-electrodes 92a, 92b, 94a and 94b, the effects of an asymmetrical bending along the x-axis are additionally minimized. In a further refinement of the specific embodiment described here, the number of segmentations of the electrodes and counter-electrodes 92a, 92b, 94a and 94b may be additionally increased.

In the specific embodiments of the acceleration sensor described above, the two seismic masses 50 and 52 or 80 and 82 are formed as two interlaced rockers. However, it is stressed here that the present invention is not restricted to interlaced rockers as seismic masses 50 and 52 or 80 and 82. Instead, seismic masses 50 and 52 or 80 and 82 may also be disposed separate and set apart from each other.

What is claimed is:

1. An acceleration sensor comprising:
a housing;
a first seismic mass which is in the form of a first antisymmetric rocker and is supported in the housing via at least one first spring in such a way that the first seismic mass is adjustable around a torsion axis of the at least one first spring in relation to the housing;
a second seismic mass which is in the form of a second antisymmetric rocker and is supported in the housing via at least one second spring in such a way that the second seismic mass is adjustable around a torsion axis of the at least one second spring in relation to the housing; and
a sensor and evaluation unit configured to (a) ascertain information regarding corresponding rotational movements of the first seismic mass and the second seismic mass in relation to the housing, and (b) determine acceleration information with respect to an acceleration of the acceleration sensor, taking the ascertained information into account;

wherein the first seismic mass and the second seismic mass are formed in such a way and, in at least one position, are positioned relative to each other such that at least one end section of the first seismic mass directed away from the torsion axis of the at least one first spring extends into at least one interspace defined by the second seismic mass; and wherein a maximum width of the at least one end section of the first seismic mass extending into the at least one interspace defined by the second seismic mass is less than a maximum width of the second seismic mass defining the at least one interspace, the respective maximum widths being defined in a direction perpendicular to the torsion axes of the first and second springs and being measured from the respective torsion axes.

2. The acceleration sensor as recited in claim 1, wherein:
the torsion axis of the at least one first spring subdivides the first seismic mass into (a) a first partial mass on a first side of the torsion axis of the at least one first spring and (b) a second partial mass on a second side of the torsion axis of the at least one first spring, the second partial mass being lighter than the first partial mass; and
the torsion axis of the second spring subdivides the second seismic mass into (a) a third partial mass on a first side of the torsion axis of the at least one second spring and (b) a fourth partial mass on a second side of the torsion axis of the at least one second spring, the fourth partial mass being heavier than the third partial mass.

3. The acceleration sensor as recited in claim 2, wherein:
the first seismic mass includes a first electrode situated on the first side of the torsion axis of the at least one first spring and a second electrode situated on the second side of the torsion axis of the at least one first spring;
the second seismic mass includes a third electrode situated on the first side of the torsion axis of the at least one second spring and a fourth electrode situated on the second side of the torsion axis of the at least one second spring; and
the sensor and evaluation unit includes four counter-electrodes fixedly disposed in relation to the housing.

4. The acceleration sensor as recited in claim 3, wherein the sensor and evaluation unit is configured such that (a) a first capacitance between the first electrode and an associated first counter-electrode of the four counter-electrodes and a fourth capacitance between the fourth electrode and an associated fourth counter-electrode of the four counter-electrodes are interconnected to form a first sum, and (b) a second capacitance between the second electrode and an associated second counter-electrode of the four counter-electrodes and a third capacitance between the third electrode and an associated third counter-electrode of the four counter-electrodes are interconnected to form a second sum.

5. The acceleration sensor as recited in claim 4, wherein the sensor and evaluation unit is configured to (a) ascertain a difference between the first sum and the second sum, and (b) determine the acceleration information regarding the acceleration of the acceleration sensor based on the difference ascertained.

6. The acceleration sensor as recited in claim 1, wherein the torsion axis of the at least one first spring lies on the torsion axis of the at least one second spring.

7. The acceleration sensor as recited in claim 1, wherein:
the first seismic mass includes a first comb-like section having at least one tooth;
the second seismic mass includes a second comb-like section having at least two teeth; and
the first seismic mass in at least one position is disposed relative to the second seismic mass in such a way that the at least one tooth of the first comb-like section extends into the at least one interspace between the at least two teeth of the second comb-like section.

8. The acceleration sensor as recited in claim 7, wherein:
the first seismic mass includes at least one third comb-like section; and
the second seismic mass includes at least one fourth comb-like section.

9. A method for operating an acceleration sensor having a housing, a first seismic mass which is formed as a first antisymmetric rocker and is supported in the housing via at least one first spring in such a way that the first seismic mass is adjustable about a torsion axis of the at least one first spring in relation to the housing, and a second seismic mass which is formed as a second antisymmetric rocker and is supported in the housing via at least one second spring in such a way that the second seismic mass is adjustable about a torsion axis of the at least one second spring in relation to the housing, the method comprising:
ascertaining information regarding corresponding rotational movements of the first seismic mass and the second seismic mass in relation to the housing; and
determining acceleration information with respect to an acceleration of the acceleration sensor, taking the ascertained information into account;
wherein the first seismic mass and the second seismic mass are formed in such a way and, in at least one position, are positioned relative to each other such that at least one end section of the first seismic mass directed away from the torsion axis of the at least one first spring extends into at least one interspace defined by the second seismic mass; and
wherein a maximum width of the at least one end section of the first seismic mass extending into the at least one interspace defined by the second seismic mass is less than a maximum width of the second seismic mass defining the at least one interspace, the respective maximum widths being defined in a direction perpendicular to the torsion axes of the first and second springs and being measured from the respective torsion axes.

* * * * *